(12) United States Patent
Oh et al.

(10) Patent No.: US 8,508,619 B2
(45) Date of Patent: Aug. 13, 2013

(54) HIGH DYNAMIC RANGE IMAGE GENERATING APPARATUS AND METHOD

(75) Inventors: Hyun-Hwa Oh, Hwaseong-si (KR);
Sung-Chan Park, Suwon-si (KR);
Jae-Hyun Kwon, Hwaseong-si (KR);
Seong-Deok Lee, Suwon-si (KR);
Won-Hee Choe, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 12/885,713

(22) Filed: Sep. 20, 2010

(65) Prior Publication Data

US 2011/0069200 A1 Mar. 24, 2011

(30) Foreign Application Priority Data

Sep. 22, 2009 (KR) ............... 10-2009-0089779

(51) Int. Cl.
*H04N 5/235* (2006.01)
(52) U.S. Cl.
USPC .................... 348/229.1; 348/221.1
(58) Field of Classification Search
USPC ................ 348/229.1, 221.1, 222.1
See application file for complete search history.

(56) References Cited

U.S. PATENT DOCUMENTS

| 6,952,234 B2 | 10/2005 | Hatano |
| 7,349,119 B2 | 3/2008 | Tsukioka |
| 2003/0103189 A1* | 6/2003 | Neureuther et al. .......... 351/176 |
| 2007/0139547 A1 | 6/2007 | Horiuchi |
| 2008/0043114 A1* | 2/2008 | Sung et al. ................. 348/221.1 |
| 2008/0055683 A1 | 3/2008 | Choe et al. |
| 2008/0266418 A1 | 10/2008 | Imai et al. |
| 2009/0040364 A1* | 2/2009 | Rubner ......................... 348/362 |
| 2009/0274387 A1* | 11/2009 | Jin ................................ 382/274 |
| 2011/0069205 A1* | 3/2011 | Kasai et al. .................... 348/239 |
| 2011/0096192 A1* | 4/2011 | Niikura ...................... 348/223.1 |
| 2011/0134298 A1* | 6/2011 | Aoyama ....................... 348/311 |

FOREIGN PATENT DOCUMENTS

| JP | 2002-271686 | 9/2002 |
| JP | 2003-179819 | 6/2003 |
| JP | 2004-159211 | 6/2004 |
| KR | 10-0763656 | 9/2007 |
| KR | 10-2007-0099238 | 10/2007 |
| KR | 10-2008-0022399 | 3/2008 |
| KR | 10-2008-0096333 | 10/2008 |

* cited by examiner

*Primary Examiner* — Tuan Ho
*Assistant Examiner* — Fayez Bhuiyan
(74) *Attorney, Agent, or Firm* — NSIP Law (57) ABSTRACT

A high dynamic range (HDR) image generating apparatus and method is provided. The HDR image generating apparatus may set an auto-exposure time, a long exposure time, a short exposure time, and a reference exposure time. The auto-exposure time may be set to be shorter than the long exposure time, the short exposure time may be set to be shorter than the auto-exposure time, and the reference exposure time may be set to fall within a range between the auto-exposure time and the short exposure time. The image generating apparatus may obtain a first image with the long exposure time and a second image with the reference exposure time, may correct motion in the first image and adjust a dynamic range of the second image, and then may composite the resultant first and second images to generate a high dynamic range image.

20 Claims, 7 Drawing Sheets

HIGH DYNAMIC RANGE IMAGE GENERATING APPARATUS AND METHOD

CROSS-REFERENCE TO RELATED APPLICATION(S)

This application claims the benefit under 35 U.S.C. §119 (a) of Korean Patent Application No. 10-2009-0089779, filed on Sep. 22, 2009, the entire disclosure of which is incorporated herein by reference for all purposes.

BACKGROUND

1. Field

The following description relates to technology to expand a dynamic range of a camera.

2. Description of the Related Art

The dynamic range of a camera is a ratio between the maximum and minimum measurable light intensities. As the dynamic range widens, the quality of representation of an image increases. Currently, commonly used digital cameras have a dynamic range of about 50 to 60 dB, which is significantly smaller than the dynamic range of human eyes, which range from about 100 to 120 dB. The dynamic range of sensors used in digital photography is many times less than that of the human eye and generally not as wide as that of chemical photographic media. In digital imaging, algorithms have been developed to map the image differently in shadow and in highlight in order to better distribute the lighting range across the image.

As one example of a method for overcoming such a limitation of the dynamic range of a digital camera, two images with captured with different exposure times can be blended together to form a composite image. The images obtained with different exposure times have different dynamic ranges, such that the composite image can have an improved dynamic range.

However, if an object is photographed continuously over a predetermined time interval, image inconsistency (for example, a ghost image and motion artifacts) may occur due to movement of a camera or the object. In light of this, there is a method to prevent image inconsistency: a region of each image, in which motion occurs, is detected and adjusted, and, if the detected motion is large, one of images is selected without compositing images.

The method of adjusting the region in which motion occurs increases the amount of operations performed for detecting and adjusting the motion. However, this method used to prevent image inconsistency by selecting one image has the disadvantage of not having an effect of expanding a dynamic range, and thus this method is not appropriate to expand the dynamic range in a dynamic environment.

SUMMARY

In one general aspect, there is provided a high dynamic range image generating apparatus, including: an exposure time setting unit configured to set a first exposure time, a second exposure time, a third exposure time, and a fourth exposure time, the second exposure time being longer than the first exposure time, the third exposure time being shorter than the first exposure time, the fourth exposure time being between the first and the third exposure times, an image obtaining unit configured to obtain: a first image based on the second exposure time, and a second image based on the fourth exposure time, and a dynamic range adjusting unit configured to adjust a dynamic range of the second image based on the third and/or the fourth exposure times.

The high dynamic range image generating apparatus may further include that the dynamic range adjusting unit is further configured to adjust the dynamic range of the second image to be substantially identical with a dynamic range of an image obtained based on the third exposure time.

The high dynamic range image generating apparatus may further include that the dynamic range adjusting unit is further configured to adjust the dynamic range of the second image based on an exposure time ratio between the third exposure time and the fourth exposure time.

The high dynamic range image generating apparatus may further include that the dynamic range adjusting unit is further configured to adjust the dynamic range of the second image based on: brightness values of individual pixels of the second image, and the exposure time ratio.

The high dynamic range image generating apparatus may further include: an image correcting unit configured to: detect regions of the first image and the second image, between which motion occurs, and correct motion of the first image based on the detected regions, and an image compositing unit configured to composite the second image in which the dynamic range has been adjusted with the first image in which motion is corrected.

The high dynamic range image generating apparatus may further include that the image correcting unit is further configured to: match brightness distribution of the first image with brightness distribution of the second image, detect the regions of the first and the second images, between which motion occurs, and replace a region of the first image corresponding to the detected region with a region of the second image corresponding to the detected region.

The high dynamic range image generating apparatus may further include that the first exposure time is specified based on an auto-exposure time that is automatically set according to a photographing environment.

In another general aspect, there is provided a method of generating a high range dynamic image, the method including: setting a first exposure time, a second exposure time, a third exposure time, and a fourth exposure time, the second exposure time being longer than the first exposure time, the third exposure time being shorter than the first exposure time, the fourth exposure time being between the first and the third exposure times, obtaining: a first image based on the second exposure time, and a second image based on the fourth exposure time, and adjusting a dynamic range of the second image based on the third exposure time and/or the fourth exposure time.

The method may further include that the dynamic range of the second image is adjusted to be substantially identical with a dynamic range of an image obtained based on the third exposure time.

The method may further include that the dynamic range of the second image is adjusted based on an exposure time ratio between the third exposure time and the fourth exposure time.

The method may further include that the dynamic range of the second image is adjusted based on brightness values of individual pixels of the second image and the exposure time ratio.

The method may further include: detecting regions of the first image and the second image, between which motion occurs, correcting motion of the first image based on the detected regions, and compositing the second image in which dynamic range has been adjusted with the first image in which motion is corrected.

The method may further include that the correcting of the motion includes: matching brightness distribution of the first image with brightness distribution of the second image, detecting the regions of the first and second images, between which motion occurs, and replacing a region of the first image corresponding to the detected region with a region of the second image corresponding to the detected region.

The method may further include that the first exposure time is specified based on an auto-exposure time that is automatically set according to a photographing environment.

In another general aspect there is provided an image generating apparatus, comprising: an exposure time setting unit configured to generate at least two different exposure times based on a photographing environment; an image obtaining unit configured to obtain images with the different exposure times; and a dynamic range adjusting unit configured to adjust a dynamic range based on the exposure time ratio between the different exposure times.

The image generating apparatus may further include that the dynamic range adjusting unit is further configured to adjust the dynamic range of a first one of the images to be substantially identical with a dynamic range of a second one of the images based on an exposure time different from the exposure times used to obtain the images.

The image generating apparatus may further include that the dynamic range adjusting unit is further configured to adjust the dynamic range of the first one of the images based on an exposure time ratio between the exposure time different from the exposure times used to obtain the images and an exposure time used to obtain the first one of the images.

The image generating apparatus may further include that the dynamic range adjusting unit is further configured to adjust the dynamic range of the second image based on: brightness values of individual pixels of the first one of the images image; and the exposure time ratio.

In another general aspect, there is provided a computer-readable information storage medium storing program for implementing a method of generating a high range dynamic image, including: setting a first exposure time, a second exposure time, a third exposure time, and a fourth exposure time, the second exposure time being longer than the first exposure time, the third exposure time being shorter than the first exposure time, the fourth exposure time being between the first and the third exposure times, obtaining: a first image based on the second exposure time, and a second image based on the fourth exposure time, and adjusting a dynamic range of the second image based on the third exposure time and/or the fourth exposure time.

The computer-readable information storage medium may further include that the dynamic range of the second image is adjusted to be substantially identical with a dynamic range of an image obtained based on the third exposure time.

The computer-readable information storage medium may further include that the dynamic range of the second image is adjusted based on an exposure time ratio between the third exposure time and the fourth exposure time.

The computer-readable information storage medium may further include that the dynamic range of the second image is adjusted based on brightness values of individual pixels of the second image and the exposure time ratio.

The computer-readable information storage medium may further include: detecting regions of the first image and the second image, between which motion occurs, correcting motion of the first image based on the detected regions, and compositing the second image in which dynamic range has been adjusted with the first image in which motion is corrected.

The computer-readable information storage medium may further include that the correcting of the motion includes: matching brightness distribution of the first image with brightness distribution of the second image, detecting the regions of the first and second images, between which motion occurs, and replacing a region of the first image corresponding to the detected region with a region of the second image corresponding to the detected region.

The computer-readable information storage medium may further include that the first exposure time is specified based on an auto-exposure time that is automatically set according to a photographing environment.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
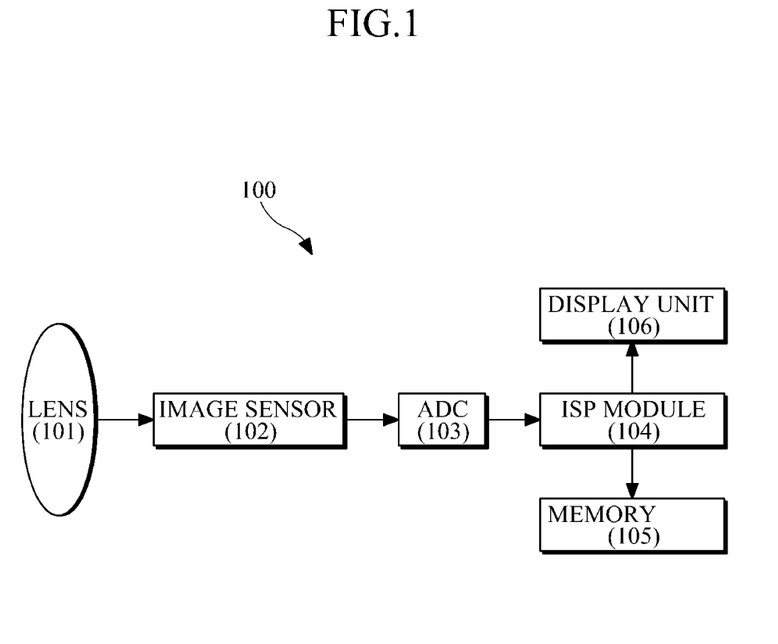
FIG. 1 is a diagram illustrating an example of an image generating apparatus.

FIG. 1 illustrates a diagram of an example of an image generating apparatus 100. Referring to FIG. 1, the image generating apparatus 100 may include a lens 101, an image sensor 102, an analog-digital converter (ADC) 103, an image signal processing (ISP) module 104, a memory 105, and a display unit 106.

Light reflected from an object may pass through the lens 101 and may be incident to the image sensor 102. The image sensor 102 may sense the incident light and may output an image signal corresponding to the sensed light. The image sensor 102 may be, for example, a solid imaging device such as a charge-coupled device (CCD) or a complementary metal-oxide semiconductor (CMOS). The image signal output from the image sensor 102 may be converted to a digital image signal by the ADC 104. The ISP module 104 may perform image processing such as color interpolation, color correction, gamma correction, and auto white balancing, on the received image signal. The image signal passing through the IPS module 104 may be stored in the memory 105 or displayed through the display unit 106.

The image signal output from the image sensor 102 may be high quality data of 10 bits or more. The intensity of the image signal may be linearly proportional to exposure duration.

However, as the ISP module 104 may perform non-linear processing such as color interpolation, color correction, gamma correction, and auto white balancing, on the received signal, the image signal output from the image sensor 102 may lose its linear characteristics and may obtain non-linear characteristics when the image signal is input to the ISP module 104.

In addition, the ISP module 104 may convert received data and may output 8-bit data to be stored or displayed. Therefore, data loss may occur in the image signal of the image sensor 102 which is high quality data of 10 bits or more.

Hence, when the ISP module 104 composites two images having different exposure times to generate a high dynamic range image, details of a composite image may be deteriorated due to the data loss and increase of non-linear characteristics.

In one example, some elements of a high dynamic range image generating apparatus may be configured to perform pre-processing on the image signal of the image sensor 102 at a front end of the ISP module 104.

Figure 2:
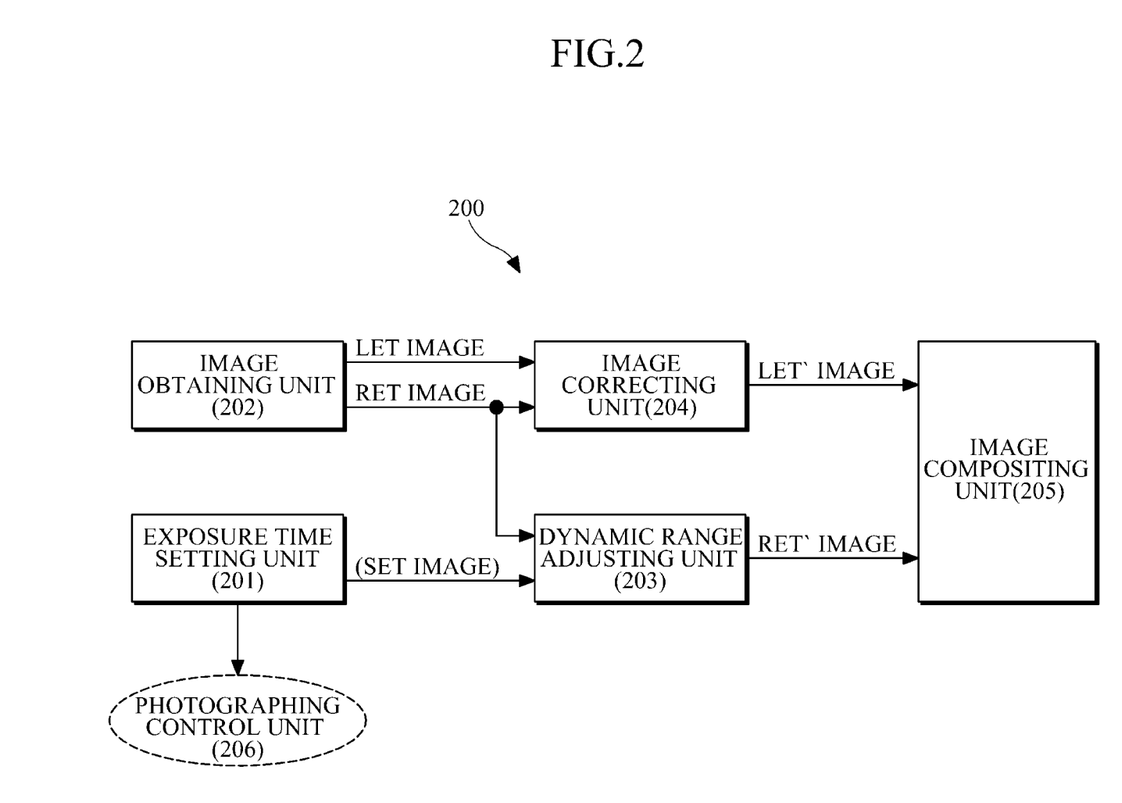
FIG. 2 is a diagram illustrating an example of a high dynamic range image generating apparatus.

FIG. 2 illustrates a diagram of an example of a high dynamic range image generating apparatus 200. Referring to FIG. 2, the high dynamic range image generating apparatus 200 may include an exposure time setting unit 201, an image obtaining unit 202, a dynamic range adjusting unit 203, an image correcting unit 204, and an image compositing unit 205.

The exposure time setting unit 201 may set a period of exposure time for photographing an object. The exposure time (ET) may be a period of time during which the image sensor 102 is exposed to light, and may be dependent on shutter speed, f-numbers (a ratio of the focal length to an aperture of an image generating apparatus, sometimes called focal ratio, f-ratio, f-stop, or relative aperture), and ISO (International Standardization Organization) sensitivity.

The exposure time setting unit 201 may identify a quantity of ambient light or a mode of photography, and then may automatically set a period of exposure time to obtain an optimal picture. In one example, the exposure time automatically set based on information of surroundings is referred to as an "auto-exposure time (AET)."

There are various examples of a method of setting an AET. For example, the exposure time setting unit 201 may determine the AET with reference to brightness distribution of an image which is displayed on the display unit 106 as a preview mode before photographing.

The exposure time setting unit 201 may set long exposure time (LET), short exposure time (SET), and reference exposure time (RET), in addition to the AET. LET may be longer than the AET. SET may be shorter than the AET. RET may be set to fall within a range between SET to AET.

Exposure time set by the exposure time setting unit 201 may be transferred to a photographing control unit 206. The photography control unit 206 may control shutter speed and the aperture setting with reference to the exposure time set at photographing.

The image obtaining unit 202 may obtain two or more images photographed with different exposure times. For example, the image obtaining unit 202 may be equivalent to the image sensor 102 of FIG. 1 and/or an image buffer that stores images obtained from the image sensor 102 frame by frame.

The image obtaining unit 202 may obtain a first image (hereinafter referred to as an "LET image") photographed with LET and a second image (hereinafter referred to as an "RET image") photographed with RET. For example, if the exposure time setting unit 201 sets AET, LET, SET, and RET, the photographing control unit 206 may control the photographing environment according to the set exposure time, such that the image obtaining unit 202 can obtain the LET image and the RET image.

The dynamic range adjusting unit 203 may adjust a dynamic range of the RET image. A dynamic range (DR) indicates a ratio between the brightest and darkest areas of an image.

The dynamic range adjusting unit 203 may adjust the dynamic range of the RET image to be the same as the dynamic range of a SET image using an exposure time ratio "r" between the SET and the RET. For example, the SET image may be an image photographed with the SET. For example, the dynamic range adjusting unit 203 may adjust the dynamic range using Equation 1 below.

$$I_{RET}'(p) = I_{RET}(p) * 1/r \qquad (1)$$

where $I_{RET}(p)$ represents a brightness value of each pixel of the RET image, r denotes a ratio between the SET and the RET, and $I_{RET}'(p)$ represents a brightness value of each pixel of the RET image of which dynamic range is adjusted. Accordingly, it may be understood that the dynamic range of the RET image is transformed to lie within the same level of the dynamic range of the SET image. In one example, transformation of the dynamic range may indicate change of the maximum and minimum values of the representable brightness level of an image while maintaining the difference between the maximum and minimum values. Referring to Equation 1, the dynamic range adjusting unit 203 may adjust the brightness level of each pixel of the RET image, enabling expansion of the dynamic range.

That is, pixels corresponding to a high brightness region of the RET image may be more likely to be saturated, compared to those of the SET image which has a shorter period of exposure time than the RET image. In one example, data loss may occur due to data conversion and quantization by an ISP module (for example, ISP module 104 in FIG. 1), and the number of pixels saturated in the high brightness region may increase, and hence the details of the image may be reduced. As the details are reduced due to the saturated pixels, the dynamic range may be decreased. However, if the brightness of an image is lowered (1/r) as shown in Equation 1 before the image is input to the IPS module 104, the brightness values of the pixels which may be potentially saturated may not be saturated, such that more details of high brightness may be represented, improving the dynamic range.

The image correcting unit 204 may correct motion between the LET image and the RET image. For example, the image correcting unit 204 may match the brightness distribution of the LET image with that of the RET image, detect regions in which motion occurs, and substitute the motion detected region of the RET image for the motion detected region of the LET image. The motion detected region may be a region in which a difference between the LET image and the RET image is produced because an object or a camera is moved between the time of obtaining the LET image and the time of obtaining the RET image. Thus, the image correcting unit 204 may substitute the motion detected region of the RET image for the motion detected region of the LET image and output a corrected LET image.

The image compositing unit 205 may composite the RET image (e.g., RET' image) the dynamic range of which has been adjusted and the LET image (e.g., LET' image) in which motion has been corrected. The composite image may be provided to a user as a high dynamic range (HDR) image.

Figure 3:
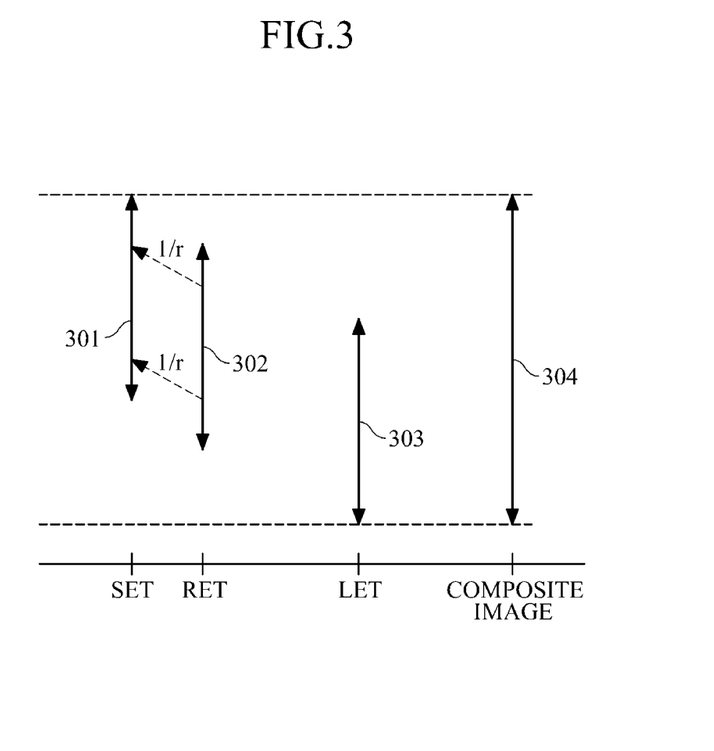
FIG. 3 is a diagram illustrating an example of a dynamic range.

FIG. 3 illustrates an example of a dynamic range. The concept of generating an HDR image is described with reference to FIG. 3.

In the example shown in FIG. 3, reference numerals 301, 302, and 303 represent respective dynamic ranges according to exposure time. The dynamic range may be represented using the maximum and minimum values of representable brightness level. The absolute ranges of the dynamic ranges 301, 302, and 303 are almost identical with one another. However, since the maximum and minimum values of the representable brightness level differ with exposure time, the dynamic range 301 of the SET image may be larger than the dynamic range 303 of the LET image.

Hence, if the SET image and the LET image are composited together, it may be possible to obtain an image having the expanded dynamic range 304.

As described above, the HDR image generating apparatus according to the example shown in FIG. 3 may use the RET image obtained with a relatively longer exposure time, improving motion correction and preventing image quality deterioration. In other words, distribution level of the dynamic range 302 of the RET image may be adjusted to be identical with distribution level of the dynamic range 301 of the SET image, and thus a dynamic range of the final composite image may be expanded into the dynamic range 304 shown in FIG. 3, and the image quality deterioration can be reduced.

Figure 4:
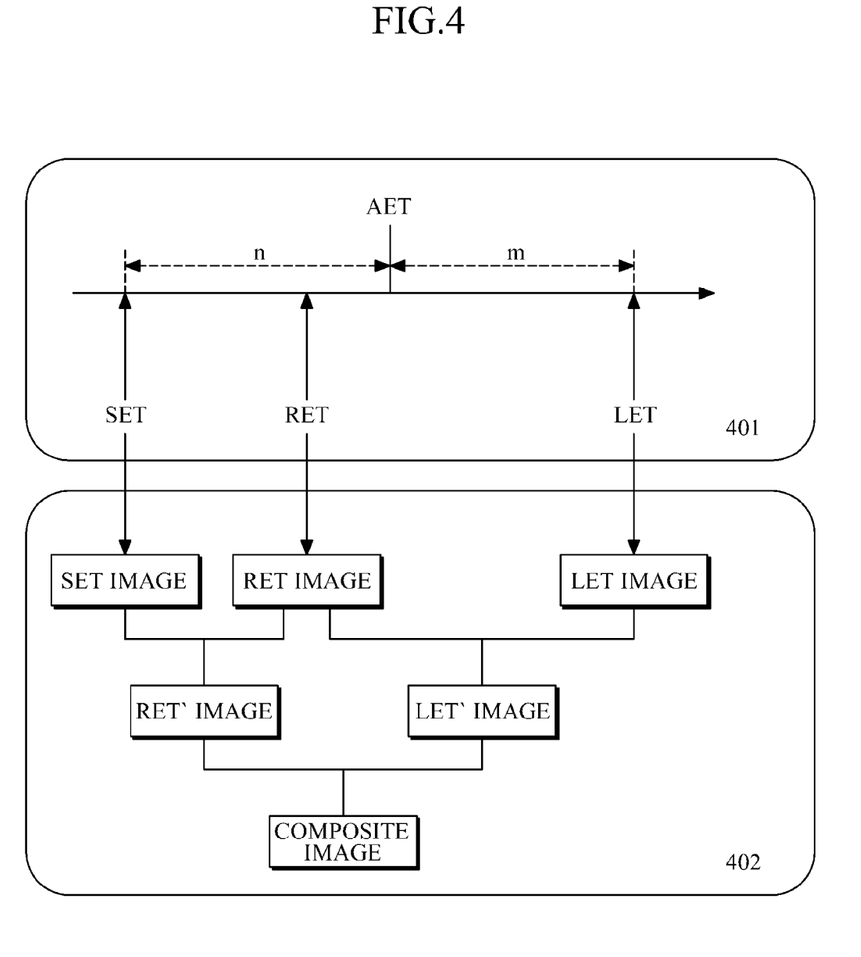
FIG. 4 is a diagram illustrating an example of images according to exposure time.

FIG. 4 illustrates an example of images according to exposure time. In FIG. 4, reference numeral 401 denotes a process of setting exposure time, and reference numeral 402 denotes process of generating an image.

Referring to 401, an automatic exposure time (AET) may be automatically set to obtain the optimal image based on information of surroundings. Once the AET is set, a predetermined value (for example, m or n) may be added to and subtracted from the AET to set a long exposure time (LET) and a short exposure time (SET). A user may set m or n directly, or m or n may be determined based on the information of surroundings. Once the LET and the SET are set, a reference exposure time (RET) may be set. The RET may be an intermediate value of the SET and the AET, or any value falling within a range from SET to AET.

Referring to 402, a SET image, an RET image, and an LET image may be images photographed with the respective SET, RET, and LET. The SET image may not be a real image but may be a virtual image obtained on the presumption that the image is photographed with the SET.

When the exposure time setting unit 201 (referring to FIG. 2) obtains the respective images with the set exposure times, the dynamic range adjusting unit 203 (referring to FIG. 2) may adjust a dynamic range of the RET image using an exposure time ratio between the SET and the RET, and may output the resultant RET image, that is, an RET' image.

The image correcting unit 204 (referring to FIG. 2) may detect motion in the RET image and the LET image, may correct any detected motion, and may output the resultant LET image, that is, an LET' image.

Then the image compositing unit 205 may composite the RET' image and the LET' image. The RET' image may have had its dynamic range changed to the extent of a dynamic range of the SET image, and a portion corresponding to a motion difference between the LET' image and the RET image may have been removed from the LET' image. Accordingly, the compositing of the RET' image and the LET' image may produce an HDR image having no motion difference, but having an expanded dynamic range.

Figure 5:
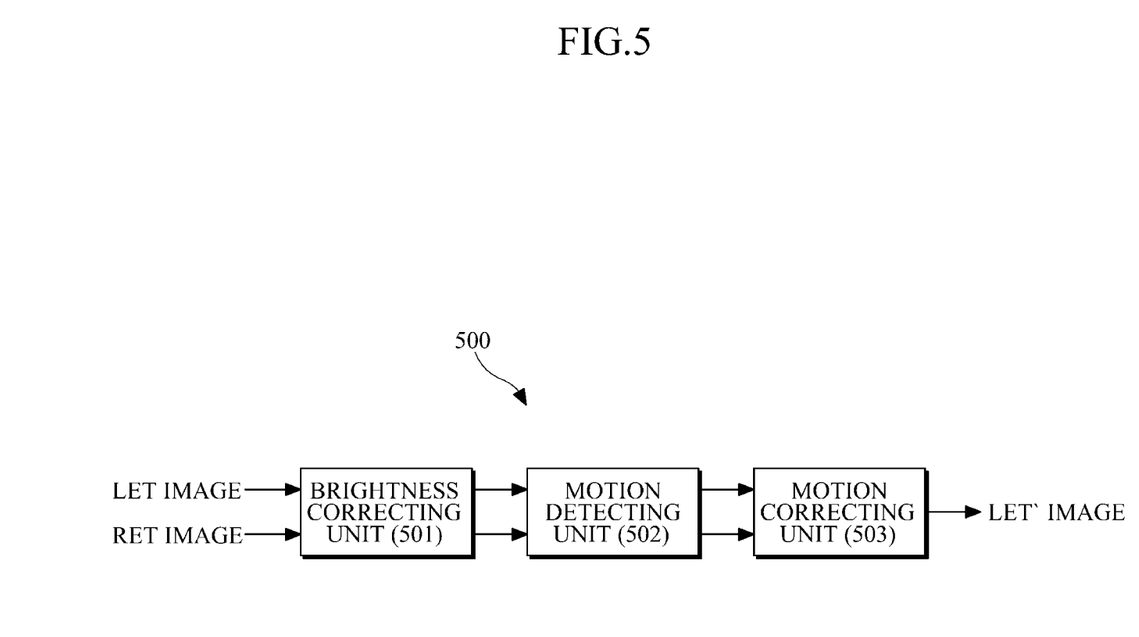
FIG. 5 is a diagram illustrating an example of an image correcting unit.

FIG. 5 illustrates an example of an image correcting unit 500. Referring to FIG. 5, the image correcting unit 500 may include a brightness correcting unit 501, a motion detecting unit 502, and a motion correcting unit 503.

The brightness correcting unit 501 may make brightness distribution of an LET image the same as that of an RET image. For example, the brightness correcting unit 501 may change the brightness distribution of the RET image to the brightness distribution of the LET image.

The motion detecting unit 502 may detect a region in which motion occurs between the LET image and the RET image which have their brightness distribution matched with each other. For example, the motion detecting unit 502 may obtain a differential image between the LET image and the RET image, and may detect the region in which motion occurs using the obtained differential image.

In addition, the motion detecting unit 502 may estimate global motion (that is, inter-frame motion occurring as the whole frame moves) between the LET image and the RET image which have had their brightness distribution matched with each other, and may adjust locations of the images before obtaining the differential image.

The motion correcting unit 503 may correct motion of the LET image using a portion having the detected motion and outputs the resultant image, that is, an LET' image.

Figure 6:
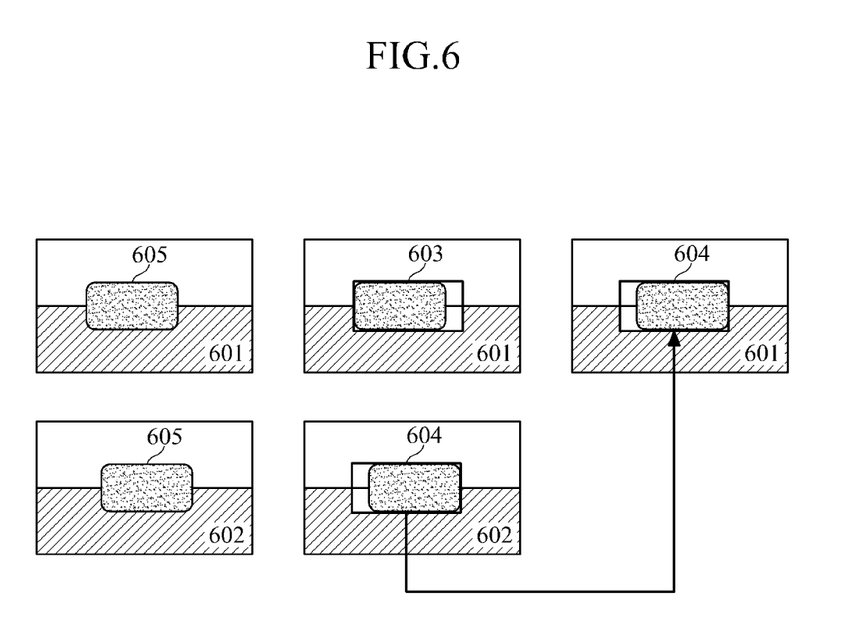
FIG. 6 is a diagram illustrating an example of an operation of the image correcting unit.

FIG. 6 illustrates an example of an operation of the image correcting unit 500 of FIG. 5. In FIG. 6, reference numerals 601 and 602 denote an LET image and an RET image, in each of which brightness adjustment and global location adjustment have been performed. Reference numerals 603 and 604 denote regions in each of which motion occurs (hereinafter referred to as an "active motion region").

For example, when the LET image 601 may be obtained at $t_0$ and the RET image 602 may be obtained at $t_1$, if an object 605 moves between $t_0$ and $t_1$, a region around the object 605 may be the active motion region 603 or 604.

In one example, the motion detecting unit 502 shown in FIG. 5 may detect the active motion region 603 or 604, and the motion correcting unit 503 may replace pixels corresponding to the active motion region 603 with pixels corresponding to the active motion region 604.

Figure 7:
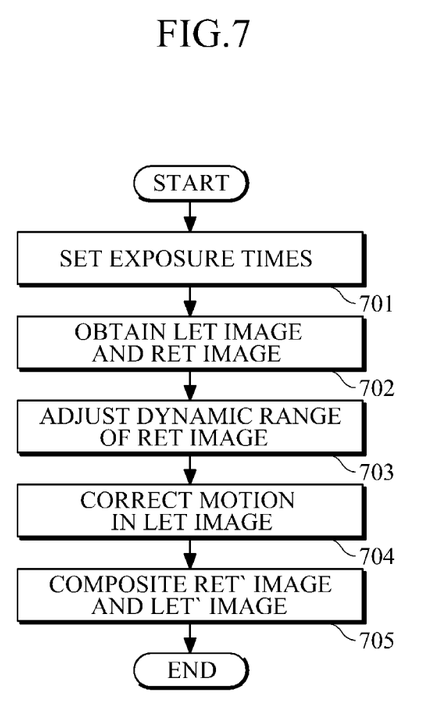
FIG. 7 is a diagram illustrating an example of a method of generating a high dynamic range image.

FIG. 7 illustrates an example of a method of generating an HDR image. Referring to FIG. 7, at operation 701, an exposure time may be set. An automatic exposure time (AET), a long exposure time (LET), a short exposure time (SET), and a reference exposure time (RET) may be set. For example, the exposure time setting unit 201 (referring to FIG. 2) may set the exposure time as shown in FIG. 3.

At operation 702, two images with different exposure times may be obtained. The obtained image may be an LET image obtained with the LET or an RET image obtained with the RET. For example, the photographing control unit 206 may obtain the LET image or the RET image by controlling the image obtaining unit 202 (referring to FIG. 2) or the image sensor 102 (referring to FIG. 1), shutter speed, or f-number, according to the set exposure time.

At operation 703, a dynamic range of the RET image may be adjusted. For example, the dynamic range control unit 203 may adjust the dynamic range of the RET image to be identical with a dynamic range of the LET image as represented by equation 1.

At operation 704, motion in the LET image may be corrected. For example, the image correcting unit 204, as shown in FIG. 6, may substitute an active motion region of the RET image for an active motion region of the LET image.

At operation 705, the RET image (that is, an RET' image) of which the dynamic range has been adjusted is composited with the LET image (that is, an LET' image) in which motion is corrected. For example, the image compositing unit 205 may composite the RET' image and the LET' image, and output an HDR image.

The term "pixel," as used herein, refers to a photo-element unit cell containing at least a photosensor for converting photons to electrical changes. The detector or photosensor of each pixel may be implemented, as nonlimiting examples only, as a pinned photodiode, a p-n junction photodiode, a Schottky photodiode, a photogate, or any other suitable photoconversion device or device that may accumulate and/or store photocharges.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup box, and the like consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A high dynamic range image generating apparatus, comprising:
an exposure time setting unit configured to set a first exposure time, a second exposure time, a third exposure time, and a fourth exposure time, the second exposure time being longer than the first exposure time, the third exposure time being shorter than the first exposure time, the fourth exposure time being between the first and the third exposure times;
an image obtaining unit configured to obtain:
a first image based on the second exposure time; and
a second image based on the fourth exposure time; and
a dynamic range adjusting unit configured to adjust a dynamic range of the second image based on an exposure time ratio between the third exposure time and the fourth exposure time.

2. The high dynamic range image generating apparatus of claim 1, wherein the dynamic range adjusting unit is further configured to adjust the dynamic range of the second image to be substantially identical with a dynamic range of an image obtained based on the third exposure time.

3. The high dynamic range image generating apparatus of claim 1, wherein the dynamic range adjusting unit is further configured to adjust the dynamic range of the second image based on:
brightness values of individual pixels of the second image; and
the exposure time ratio.

4. The high dynamic range image generating apparatus of claim 1, further comprising:
an image correcting unit configured to:
detect regions of the first image and the second image, between which motion occurs; and
correct motion of the first image based on the detected regions; and
an image compositing unit configured to composite the second image in which the dynamic range has been adjusted with the first image in which motion is corrected.

5. The high dynamic range image generating apparatus of claim 4, wherein the image correcting unit is further configured to:
match brightness distribution of the first image with brightness distribution of the second image;
detect the regions of the first and the second images, between which motion occurs; and
replace a region of the first image corresponding to the detected region with a region of the second image corresponding to the detected region.

6. The high dynamic range image generating apparatus of claim 1, wherein the first exposure time is specified based on an auto-exposure time that is automatically set according to a photographing environment.

7. A method of generating a high range dynamic image, the method comprising:
   setting a first exposure time, a second exposure time, a third exposure time, and a fourth exposure time, the second exposure time being longer than the first exposure time, the third exposure time being shorter than the first exposure time, the fourth exposure time being between the first and the third exposure times;
   obtaining:
      a first image based on the second exposure time; and
      a second image based on the fourth exposure time; and
   adjusting a dynamic range of the second image based on an exposure time ratio between the third exposure time and the fourth exposure time.

8. The method of claim 7, wherein the dynamic range of the second image is adjusted to be substantially identical with a dynamic range of an image obtained based on the third exposure time.

9. The method of claim 7, wherein the dynamic range of the second image is adjusted based on brightness values of individual pixels of the second image and the exposure time ratio.

10. The method of claim 7, further comprising:
    detecting regions of the first image and the second image, between which motion occurs;
    correcting motion of the first image based on the detected regions; and
    compositing the second image in which dynamic range has been adjusted with the first image in which motion is corrected.

11. The method of claim 10, wherein the correcting of the motion comprises:
    matching brightness distribution of the first image with brightness distribution of the second image;
    detecting the regions of the first and second images, between which motion occurs; and
    replacing a region of the first image corresponding to the detected region with a region of the second image corresponding to the detected region.

12. The method of claim 7, wherein the first exposure time is specified based on an auto-exposure time that is automatically set according to a photographing environment.

13. An image generating apparatus, comprising:
    an exposure time setting unit configured to generate at least two different exposure times based on a photographing environment;
    an image obtaining unit configured to obtain images with the different exposure times; and
    a dynamic range adjusting unit configured to adjust a dynamic range of one of the images based on the exposure time ratio between two of the different exposure times, wherein:
    the dynamic range adjusting unit is further configured to adjust the dynamic range of a first one of the images to be substantially identical with a dynamic range of a second one of the images based on an exposure time different from the exposure times used to obtain the images, and the dynamic range adjusting unit is further configured to adjust the dynamic range of the first one of the images based on an exposure time ratio between the exposure time different from the exposure times used to obtain the images and an exposure time used to obtain the first one of the images.

14. The image generating apparatus of claim 13, wherein the dynamic range adjusting unit is further configured to adjust the dynamic range of the second image based on:
    brightness values of individual pixels of the first one of the images; and
    the exposure time ratio between the exposure time different from the exposure times used to obtain the images and an exposure time used to obtain the first one of the images.

15. A non-transitory computer-readable information storage medium storing a program for implementing a method of generating a high range dynamic image, the storage medium comprising:
    setting a first exposure time, a second exposure time, a third exposure time, and a fourth exposure time, the second exposure time being longer than the first exposure time, the third exposure time being shorter than the first exposure time, the fourth exposure time being between the first and the third exposure times;
    obtaining:
       a first image based on the second exposure time; and
       a second image based on the fourth exposure time; and
    adjusting a dynamic range of the second image based on an exposure time ratio between the third exposure time and the fourth exposure time.

16. The computer-readable information storage medium of claim 15, wherein the dynamic range of the second image is adjusted to be substantially identical with a dynamic range of an image obtained based on the third exposure time.

17. The computer-readable information storage medium of claim 15, wherein the dynamic range of the second image is adjusted based on brightness values of individual pixels of the second image and the exposure time ratio.

18. The computer-readable information storage medium of claim 15, further comprising:
    detecting regions of the first image and the second image, between which motion occurs;
    correcting motion of the first image based on the detected regions; and
    compositing the second image in which dynamic range has been adjusted with the first image in which motion is corrected.

19. The computer-readable information storage medium of claim 18, wherein the correcting of the motion comprises:
    matching brightness distribution of the first image with brightness distribution of the second image;
    detecting the regions of the first and second images, between which motion occurs; and
    replacing a region of the first image corresponding to the detected region with a region of the second image corresponding to the detected region.

20. The computer-readable information storage medium of claim 15, wherein the first exposure time is specified based on an auto-exposure time that is automatically set according to a photographing environment.

* * * * *